3,829,491
ORGANIC THERMOTROPIC NEMATIC COMPOUNDS

Elwood L. Strebel, c/o Vari-Light Corporation, 9770 Conklin Road, Cincinnati, Ohio 45242
No Drawing. Continuation-in-part of abandoned application Ser. No. 817,143, Apr. 17, 1969. This application May 24, 1973, Ser. No. 363,429
Int. Cl. C07c 119/00
U.S. Cl. 260—566 F    4 Claims

ABSTRACT OF THE DISCLOSURE

A new family of organic thermotropic nematic compounds comprising N-(para-substituted alkoxy-benzylidene)-anilines having also a para-n-butyl substituent on the aniline ring. These compounds have the following structural formula:

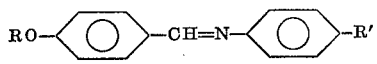

wherein R is a straight chain alkyl group containing 1 to 4 carbon atoms and R' is n-butyl. Synthesis involves combining the desired p-substituted benzaldehyde and p-n-butyl aniline in equimolar proportions in anhydrous ethyl alcohol with glacial acetic acid as catalyst. The resulting homologous series of compounds are useful as materials which undergo a change in optical properties under the influence of externally applied energy, preferred members of which, either individually or in binary mixtures, have melting points near room temperature, a broad nematic mesomorphic temperature range within an overall range of about 0° to about 70° C., low viscosity in the nematic phase, good stability, and substantially no color.

CROSS-REFERENCE TO RELATED APPLICATION

This is a continuation-in-part of application Ser. No. 817,143, filed Apr. 17, 1969 in the name of Elwood L. Strebel, now abandoned.

BACKGROUND OF THE INVENTION

This invention relates to compounds which have a mesomorphic phase of the nematic liquid crystalline type. Materials having a mesomorphic phase do not pass directly from the solid crystalline state to the liquid isotropic state upon being heated, but rather have an intermediate state in which the material has some of the physical properties of a liquid and some of the optical properties of a crystal within their mesomorphic temperature ranges.

It should be recognized that externally applied energy, such as an electric potential, strong magnetic field, heat, ultrasonic vibrations, and even mechanical vibrations, causes a change in the molecular orientation and/or movement which results in changes in optical properties. Such changes include, but are not limited to, birefringence, light diffusion or scattering, light dispersion, or a combination thereof.

There are several mesomorphic phases or forms, mainly, the nematic, smectic and cholesteric mesophases. The term "nematic" means "thread-like" and is applied to those materials which, when in their mesomorphic stage assume a characteristic thread-like texture in which the molecules or aggregates thereof have one axis parallel. This is the lowest degree of order of molecular arrangement of the several mesomorphic phases, the smectic phase being of the next higher order of molecular arrangement. The cholesteric mesophase is a special case of the nematic phase.

The present invention is concerned with a new family of thermotropic nematic compounds. While there are numerous known thermotropic nematic compounds, such as 4,4' di-n-heptoxyazoxybenzene, p-azoxy anisole, and anisylidene p-aminophenylacetate, these materials as a group have the drawback that their nematic mesophases occur at temperatures well above room temperature. As a result their utility is limited to applications within their elevated nematic temperature ranges. Moreover, such compounds have relatively high viscosities when in the nematic range and may have sufficient color to mask the change in optical properties. In addition, many of the known nematic compounds are expensive to produce and difficult to synthesize.

A few homologues outside the defined group of compounds of the present invention have been disclosed in the prior art, but these prior art homologues either exhibit no nematic phase or exhibit a nematic phase starting at relatively high temperatures (e.g. about 85° C.). Reference may be made to Zeit. Phys. Chem., vol. 53B, pp. 75–84 (1942); J. Chem. Soc., pp. 4616–4617 (1954) and pp. 4305–4306 (1955); and Chem. Abstracts, v. 69, col. 43200(g) (1968).

The following compound, falling outside the definition of the novel compounds of the present invention, was found to be unsuitable for the purposes of the present invention: N-(p-ethoxybenzylidene)-p-methyl aniline.

SUMMARY OF THE INVENTION

The present invention relates to a new group of thermotropic nematic compounds, preferred members of which exhibit a relatively broad mesomorphic temperature range which includes generally encountered ambient temperatures. In the case of other compounds having a nematic phase at temperature ranges somewhat above room temperature, it has been found that these form eutectic mixtures with other compounds of the groups, which mixtures exhibit a nematic phase at a lower temperature range, i.e., substantially below the nematic temperature range of either compound in the pure state. The compounds additionally have low viscosity in the nematic range with consequent rapid response to externally applied energy and are nearly colorless. These compounds are also simple to produce utilizing relatively inexpensive starting materials.

Compounds in accordance with the invention will find widespread usage in a variety of applications wherein it is desired to convert energy input into visual form or to effect a visual display, inclusive of optical display devices, light valves, light modulators and similar applications.

It has been recognized that practical application of change of optical properties of the nematic liquid crystals, e.g. in visual and/or graphic display devices, read out systems in calculators, panel meters, digital watches and the like, requires that the compounds, or mixtures thereof, have a realtively broad nematic range overlapping the temperature range of about 10° to about 40° C., in order that such devices and systems can operate a normally encountered temperatures.

The compounds of the present invention are the first to meet the above requirements, in combination with low viscosity in the nematic phase, good stability, substantial lack of color and low cost. It is thus apparent that the compounds of the present invention will operate without the provision of external heating to cause the compounds to enter their nematic phase. Moreover, it is generally not necessary to insulate the compounds from heat exchange.

DESCRIPTION OF THE PREFERRED EMODIMENTS

Homologous compounds of the invention having the above described properties are as follows:
N-(p-methoxybenzylidene)-p-n-butyl aniline
N-(p-ethoxybenzylidene)-p-n-butyl aniline
N-(p-propoxybenzylidene)-p-n-butyl aniline
N-(p-butoxybenzylidene)-p-n-butyl aniline.

The lowest homologue of the series has the following structural formula:

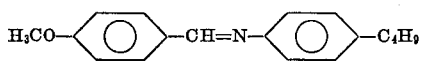

The highest homologue of the series has the following structural formula:

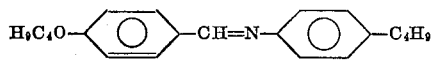

The compounds of the present invention can be synthesized from relatively simple and inexpensive raw materials by conventional reactions, or from commercially available intermediate compounds such as para-alkoxybenzaldehydes and para-n-butyl aniline.

The alkoxybenzaldehyde is reacted with the para-substituted n-butyl aniline in stoichiometric quantities (equimolar proportions) in 20–30 parts of anhydrous ethanol, using about 0.1% glacial acetic acid as a catalyst. The mixture is refluxed for a short period of time during which about ⅔ of the solvent is removed. The residual solution is cooled in an ice-bath, resulting in precipitation of the reaction product. The precipitate is then filtered and purified by recrystallization from ethanol two or more times.

The reaction is represented by the following equation:

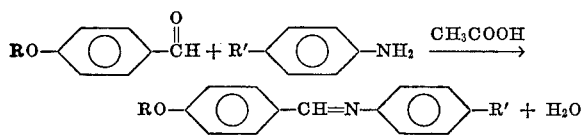

The approximate melting points and nematic ranges of the compounds of the instant invention are set forth in Table I below.

TABLE I

| Example | Melting point, °C. | Nematic range, °C. |
|---|---|---|
| 1... N-(p-methoxybenzylidene)-p-n-butyl aniline. | ~10 | ~10–471 |
| 2... N-(p-ethoxybenzylidene)-p-n-butyl aniline. | 34 | 34–80 |
| 3... N-(p-n-propoxybenzylidene)-p-n-butyl aniline. | 32 | 32–56 |
| 4... N-(p-n-butoxybenzylidene)-p-n-butyl aniline. | 32 | 32–55 |

The nematic ranges of exemplary eutectic mixtures of the preferred compounds of the invention (Examples 1 and 2) and of Examples 2 and 3 are set forth in Table II below. The term eutectic mixture is used herein to designate a mixture of 2 or more compounds of the invention, which mixture has a melting point lower than those of any of the pure compounds.

Eutectic mixtures of the compounds of the invention can thus be utilized to obtain overall nematic ranges as broad as from about 0° to about 70° C., thereby providing utility over a wide variety of applications and conditions.

TABLE II

| Eutectic mixture | | Nematic range of— | |
|---|---|---|---|
| | | Pure compound, °C. | Eutectic mixture, °C. |
| A | Example 2 | 34–80 | 10–68 |
|   | Example 3 | 32–56 |  |
| B | Example 1 | ~10–47 | 0–63 |
|   | Example 2 | 34–80 |  |

Viscosity measurements were not made, but the viscosities of the examples of Table I above when in the nematic range were observed to be slightly above the viscosity of water.

All the compounds of Table I were substantially colorless, and this class of compounds characteristically exhibits good stability when subjected to heat and good stability to ultraviolet light.

In summary the present invention provides a novel series of compounds, wherein the preferred compound N-(p-methoxybenzylidene)-p-n-butyl aniline has a nematic mesomorphic phase ranging between about 10° and 47° C., wherein the preferred compound N-(p-ethoxybenzylidene)-p-n-butyl aniline has a nematic mesomorphic phase ranging between 34° and 80° C., and mixtures of these two compounds exhibit a nematic mesomorphic phase ranging between about 0° and 63° C. Moreover, these compounds are characterized by a broad nematic temperature range, low viscosity when within the nematic range, substantial lack of color, good stability against heat and ultraviolet light, and relatively low cost. Finally, the nematic ranges of the higher melting point members of the group of compounds of this invention can be extended downwardly by forming eutectic mixtures thereof with one another or with the preferred compounds.

While the invention has been described in language more or less specific as to preferred embodiments, it is to be understood that the invention is not so limited but is to be construed as covering, e.g. modifications wherein the compounds herein disclosed are mixed with other components of known type, including other than nematic compounds, thereby obtaining modified properties without sacrificing any of the advantages of the invention.

The embodiments of the invention in which an exclusive property or privilege is claimed are defined as follows:

1. N-(p-methoxybenzylidene)-p-n-butyl aniline.
2. N-(p-ethoxybenzylidene)-p-n-butyl aniline.
3. N-(p-n-propoxybenzylidene)-p-n-butyl aniline.
4. N-(p-n-butoxybenzylidene)-p-n-butyl aniline.

References Cited

Weygand: Z. Phys. Chem., vol. 53, pp. 75–77 (1942).
Gabler: Inaugral - Dissertation, Leipzig (Germany) (1939).
Chemical Abstracts, vol. 69, col. 43200(g) (1968).
Dove et al.: J. Chem. Soc., pp. 4616–7 (1954).

BERNARD HELFIN, Primary Examiner

G. A. SCHWARTZ, Assistant Examiner

U.S. Cl. X.R.

350—160 R